Oct. 26, 1954
J. H. CONE
2,692,938
ILLUMINATED CIGAR LIGHTER
Filed Dec. 1, 1950
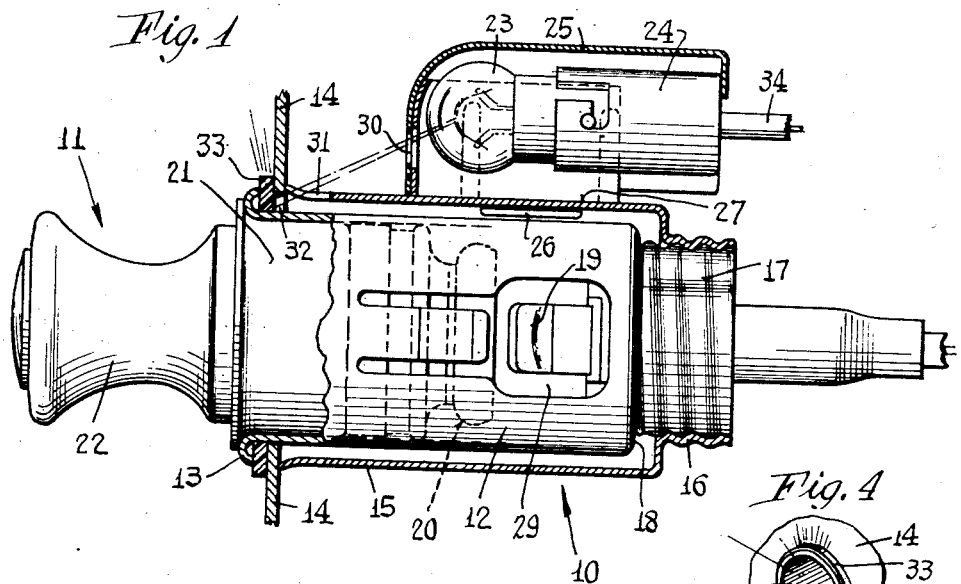
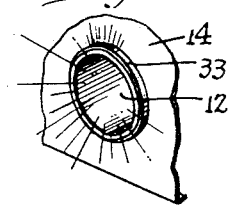
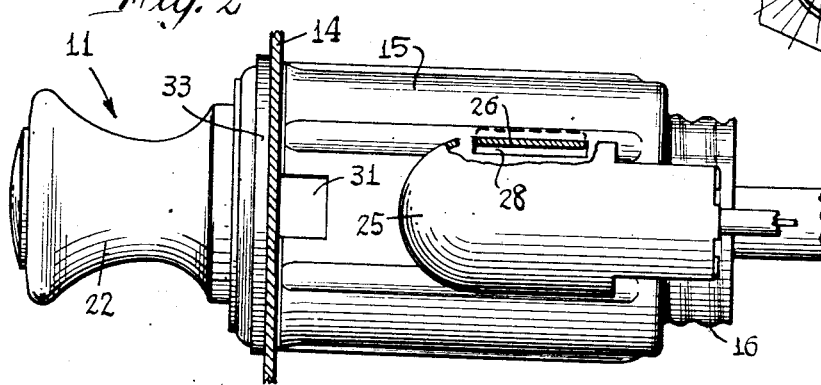
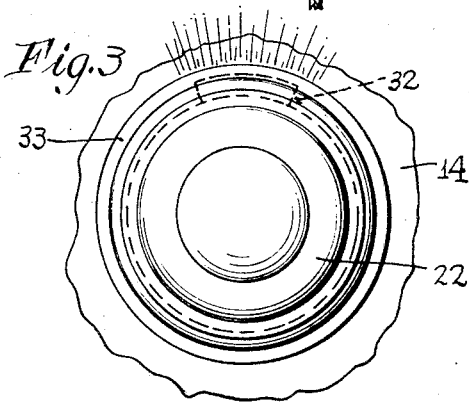
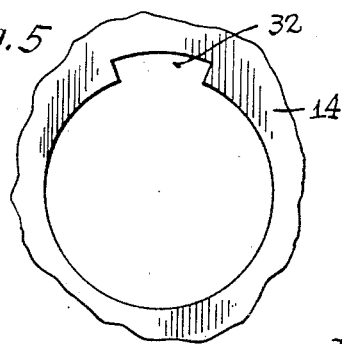
Inventor
Joseph H. Cone.
By
Johnson and Kline
Attorneys Patented Oct. 26, 1954

2,692,938

UNITED STATES PATENT OFFICE 2,692,938

ILLUMINATED CIGAR LIGHTER

Joseph H. Cone, Bridgeport, Conn., assignor to Casco Products Corporation, Fairfield, Conn., a corporation of Connecticut Application December 1, 1950, Serial No. 198,677

7 Claims. (Cl. 240—2)

This invention relates to cigar lighters such as the electric cigar lighters used in automobiles, and more particularly to electric cigar lighters of the removable igniting unit type.

An object of the invention is to provide an improved, simplified electric cigar lighter of the above general type, which is particularly convenient and safe to use while driving at night, thereby to minimize the likelihood of accident.

It often happens that, when driving at high speeds, a driver desires to light a cigarette, and in such event he usually takes his eyes off the road for a moment to locate the cigarette lighter and depress the button or knob. When the lighter is ready for use he again takes his eyes from the road to remove the igniting unit, and after obtaining a light he removes his eyes a third time to return the igniting unit to the holder or well on the dashboard. While obviously the prudent thing would be for the driver to slow down before obtaining a light, the fact remains that usually he does not diminish speed but instead attempts to obtain his light in the accustomed manner.

According to the present invention I provide an improved and simplified cigar lighter for automobiles, which greatly helps the driver to locate the lighter knob quickly in the dark, and facilitates the replacement of the igniting unit in the lighter well after its use, thereby reducing the time that the driver's eyes are diverted from the road when the car is traveling at high speeds. Accordingly, with my improved cigar lighter, a much greater degree of safety is had at night time, particularly when driving fast. In accomplishing this, I provide a novel combination structure producing a subdued yet readily visible lighted area adjacent the cigar lighter knob at all times that the igniting unit is carried in the holder or well of the lighter, and provide a lighted area within the well whenever the igniting unit is removed therefrom, as for the purpose of lighting a cigarette. I accomplish such illumination, in the embodiment of the invention illustrated herein, by the use of but a single light source which may be advantageously operated in conjunction with the lighting system of the automobile so as to be automatically illuminated whenever the car lights are in use. Thus, with the present improved illuminated electric cigar lighter, safety may be had at night which closely approaches the safety had in the day time when all parts of the instrument panel are in daylight.

In the said embodiment of the invention illustrated herein, I provide an electric light bulb mounted on the holder or well of the cigar lighter, said bulb being connected with the lighting circuit of the automobile to be energized whenever the lights are turned on. I further provide light-admitting openings or passages in the well whereby the interior of the same will be brightly illuminated by the bulb when the igniting unit is removed from the well, and in conjunction with this I provide an illuminable member such as a plastic bezel defining the opening of the well, said bezel being in light-receiving relation with the electric bulb to be illuminated thereby. The arrangement is such that when the igniting unit is carried in the well of the cigar lighter, a portion of the bezel adjacent the knob of the igniting unit will be illuminated at all times, thereby enabling the driver to quickly locate the knob whenever he desires to use the cigar lighter. After the igniting unit has been removed from the cigar lighter, the interior of the well will be brightly illuminated, enabling the user to quickly and accurately replace the igniting unit after obtaining a light. The illumination of the bezel is somewhat subdued so as to not interfere with the driving of the automobile, yet is sufficiently bright to enable the driver to quickly locate the knob when desired.

Other features and advantages will hereinafter appear.

In the accompanying drawings:

Figure 1 is a side view of the improved illuminated cigar lighter of the present invention, a portion of the holding device and illuminating means being shown in vertical section.

Fig. 2 is a top or plan view of the cigar lighter shown in Fig. 1.

Fig. 3 is a front elevation view of the lighter with the igniting unit in place.

Fig. 4 is a perspective view of the well or holder of the cigar lighter, with the igniting unit removed.

Fig. 5 is a fragmentary front elevational view of a portion of the instrument panel on which the cigar lighter is mounted, showing the mounting and light-admitting apertures thereof.

Referring to Figs. 1 and 2, the improved illuminated cigar lighter of the present invention comprises a holding device generally designated by the numeral 10 and a plug-like igniting unit generally designated by the numeral 11. The holding device 10 is in the form of a receptacle, and includes a tubular shell 12 having an outwardly turned flange 13 at its front end, defining a recess or well into which the igniting unit 11 may be inserted. The flange 13 provides an abutment at the front of the instrument panel 14, the rear of the panel being engaged by one end of a tubular clamping sleeve 15 the other end 16 of which is reduced in diameter and threaded to enable it to be screwed onto a threaded cup 17 secured to the rear end-wall 18 of the shell 12.

As is well understood, the holding device 10 may have bimetallic spring contact clips 19 adapted to engage a contact cup 20 of the igniting unit 11 when the latter is depressed and inserted deeply in the holder 10. The igniting unit 11 includes a body portion 21 mounting at its front end a knob 22 and mounting at its rear end a heating element (not shown), within the cup 20.

In accordance with the present invention a novel means is provided, associated with the holding device 10, for illuminating the recess or well provided by said device when the igniting unit 11 is removed therefrom, and also for illuminating a front portion of the holding device 10 adjacent the knob 22, thereby to greatly aid a driver to use the cigar lighter at night, and to reduce the risk of accident when the cigar lighter is being used while the car is operated at high speeds.

Referring to Figs. 1 and 3, the illumination of the exposed forward portion of the holding device is indicated by the divergent lines representing rays of light; in Fig. 4 the illumination of the front portion of the holding device, and also of the well of the holding device, is indicated by the divergent lines representing rays of light.

In accomplishing such illumination I provide, in accordance with the invention, a novel organization comprising an incandescent electric lamp 23 carried in a socket 24 mounted within a partially cylindrical housing 25 secured to the outside of the clamping sleeve 15. Such securement may be effected by means of a pair of bent tongues 26 formed on the lower edge portions 27 of the housing 25, the tongues passing through slots 28 in the sleeve 15 and engaging the inner surfaces of the sleeve to lock the housing 25 thereto.

Details of such construction whereby the lamp housing 25 is secured to the sleeve 15 may be found in Patent No. 2,506,181, issued to Joseph O. Thibault on May 2, 1950, and entitled "Illuminated Cigar Lighter."

As shown in Fig. 2, the slots 28 in the sleeve 15 are wider than the thickness of the metal constituting the tongues 26, thereby providing an inside clearance which admits light from the lamp 23 to the interior of the sleeve 15 and shell 12 of the holding device 10. Such light, when passing through the slots 28, first illuminates the interior of the sleeve 15 and then passes through relatively large openings 29 (of which there are a number) in the shell 12, to light up the shell interior.

By the present invention I provide light-admitting openings or passages 30, 31 and 32 respectively in the housing 25, clamping sleeve 15 and instrument panel 14, and provide an illuminable member 33 under the flange 13 of the holding device and in the path of rays passing through the openings 30, 31 and 32 from the lamp 23. The illuminable member 33 is preferably in the form of a washer, and may be advantageously formed of a plastic material such as Lucite (methyl methacrylate resin) having the property of conducting light. As shown in Figs. 1, 3 and 4, when light from the lamp 23 strikes the illuminable member 33 the latter will glow in the neighborhood of the opening 32 in the instrument panel 14, and will therefore apprise a user of the location of the cigar lighter and of the knob 11. In order to provide such illumination at all times that the car is being driven in the dark, the lamp 23 is preferably energized simultaneously with the car headlights, as by connecting the lead wire 34 from the lamp to the light switch (not shown) of the automobile.

Not only will the member 33 glow at all times that the lights of the car are turned on, to enable a user to quickly and accurately locate the knob 22 of the lighter, but the recess or well of the holding device 10 will glow when the igniting unit 11 has been removed therefrom, thereby to enable the user to quickly and accurately replace the igniting unit in the holder.

Accordingly the attention of the user, if he should be the driver of the vehicle, is diverted from the road for the least possible time, making for the maximum degree of safety when driving at night, particularly at high speeds encountered under present day conditions.

Variations and modifications may be made within the scope of the claims and portions of the improvements may be used without others.

I claim:

1. In a cigar lighter adapted for panel mounting, a holding device in the form of a receptacle having means including a recess at its front for removably supporting an igniting unit placed in said recess; an exposed ring of material capable of transmitting light, mounted on the outside of the receptacle, said ring being adjacent and surrounding the mouth of said recess; clamping means for mounting the receptacle in a panel aperture appreciably larger than the receptacle, with the mouth of the recess being disposed adjacent said aperture, said exposed ring being located for disposition at the front of the panel in a position to overlie an outer zone of said panel aperture; a source of light; and means including said clamping means, mounting said source of light at the exterior of the receptacle in position to be directly rearward of a portion of said panel adjacent the aperture thereof, said clamping means including a member extending along and closely adjacent the outside of the receptacle and engageable with the back of the panel, said member having a light-admitting opening enabling the ring to be in direct light-receiving relation to the light source to be illuminated thereby through said panel aperture and past the exterior of the receptacle regardless of whether or not the igniting unit is in the recess.

2. In combination, a supporting panel having a mounting aperture; a cigar lighter carried by the panel, said cigar lighter including a holding device comprising a receptacle having a clamp provided with a panel-engaging portion, for mounting the receptacle on the panel through the aperture thereof, said mounting aperture being appreciably larger than is necessary to receive the receptacle whereby a substantial clearance exists between the receptacle and edge of the mounting aperture, said receptacle having a front and a rear portion, the latter portion being disposed in back of said panel-engaging portion of the clamp, and said receptacle having a recess opening at said front portion to receive and removably support an igniting unit; a member of material capable of transmitting light, said member having a visible exposed surface and being located at said front portion of the receptacle and overlying the clearance between the receptacle and edge of said mounting aperture, said clamp mounting said member; a source of light disposed directly rearward of a portion of said panel and carried at the exterior of the rear portion of the receptacle on the clamp; and a housing enclosing said source of light, carried by the clamp and having a front wall spaced behind the panel, said housing having an opening in said front wall enabling light to pass forwardly of the exterior of the receptacle and through the clearance between the edge of the mounting aperture and the receptacle to directly illuminate at least a portion of said member having the exposed surface, to make the same visible in the dark regardless of whether or not the igniting unit is in said recess.

3. In combination, a supporting panel having a mounting aperture; a cigar lighter comprising a holding device having panel-engaging means mounting it on the panel to extend through the aperture thereof, and having a front and a rear portion, said rear portion being disposed in back of said panel-engaging means and said holding device having a recess opening at said front portion to receive and removably support an igniting unit, the mounting aperture of the panel being larger than the holding device to provide for clearance therebetween; a member of translucent, light-transmitting material having a visible exposed surface located at said front portion of the holding device, and having a light-receiving surface in light-transmitting relation with said exposed surface and overlying a part of the aperture of the panel, said holding device having means mounting said member; a source of light carried on the exterior of the rear portion of the holding device; and a housing for said source of light, carried on the exterior of the holding device and having an opening at its front enabling light to pass forwardly of the holding device and through the clearance of the aperture of the panel so as to strike the light-receiving surface of said member to light up the exposed surface thereof and make the same visible in the dark regardless of whether or not the igniting unit is in said recess, said panel-engaging means including a flange at the front of the holding device, and said translucent member being ring-like and in part disposed behind the said flange, and extending around the recess opening of the holding device.

4. The invention as defined in claim 3 in which the panel-engaging means includes a sleeve carried by and surrounding the holding device and engageable with the rear of the panel, said sleeve extending between the source of light and the member with visible exposed surface, and having a light passage therein to enable light from said source to pass through it in the direction of said member.

5. In combination, a supporting panel having a mounting aperture; a cigar lighter carried by the panel, said cigar lighter including a holding device comprising a receptacle provided with clamping means having a panel-engaging portion, said clamping means mounting the receptacle on the panel through the aperture thereof, and said receptacle having a front and a rear portion, said rear portion being disposed in back of said panel-engaging portion of the clamping means and said receptacle having a recess opening at said front portion to receive and removably support an igniting unit, the mounting aperture of the panel being larger than the size required to accommodate the receptacle whereby part of the aperture is unused for mounting; a member of material capable of transmitting light, having a visible exposed surface, said member being located at said front portion of the receptacle and overlying the unused part of the aperture of the panel, said receptacle having means mounting said member; a source of light disposed directly rearward of a portion of the panel and carried at the exterior of the rear portion of the receptacle and on the said clamping means, the latter extending in part between the source of light and the receptacle; a housing enclosing said source of light and carried by the clamping means, said housing and clamping means having aligned light passages enabling light to pass forwardly of the receptacle and through the unused part of the mounting aperture to directly illuminate at least a portion of said member having the exposed surface, to make the same visible in the dark regardless of whether or not the igniting unit is in said recess.

6. In combination, a panel having an opening therein; a cigar lighter comprising a holding device including a tubular shell having an open front portion and a light-transmitting member adjacent said portion and exterior to the shell; means including a tubular sleeve surrounding the shell, mounting the latter on the panel through the opening thereof, said panel opening being larger than the cross section of the shell and said sleeve and shell having wall openings to admit light from outside the sleeve into the interior of the shell; a lamp housing disposed directly rearward of and spaced from a portion of the panel adjacent the said opening, said housing being mounted on the sleeve over a wall opening thereof; and an electric lamp in said housing, for producing light to pass through said wall openings and into the shell, said housing and sleeve having cooperating openings disposed forwardly of the lamp and aligned with each other and the lamp to pass light directly therefrom forwardly between the exterior of the shell and the panel through the opening in the latter, thereby to illuminate the said light-transmitting member at the front portion of the shell.

7. In a cigar lighter, a holding device having means including a recess at its front for removably supporting an igniting unit placed in said recess; an exposed member of material capable of transmitting light, and means on the holding device supporting said member adjacent the mouth of said recess; a panel having a mounting aperture; means mounting the holding device on the panel through the aperture thereof, with the said exposed member disposed at the front of the panel, said aperture being larger than the size required to accommodate the holding device whereby part of said aperture is unused for mounting, said member having a portion adapted to overlie said unused part of said aperture; a source of light disposed directly rearward of a portion of the panel adjacent the mounting aperture; means mounting said source of light on the exterior of the holding device in a position to shine through the unused part of the aperture of the panel, said holding device mounting means including a component extending between the holding device and the source of light and having a light-admitting opening between said light source and exposed member enabling said member to be in direct light-receiving relation with the light source for illumination thereby regardless of whether or not the igniting unit is in the recess.

References Cited in the file of this patent

UNITED STATES PATENTS

| Number | Name | Date |
| --- | --- | --- |
| 2,097,625 | Langlotz | Nov. 2, 1937 |
| 2,187,551 | Zwack | Jan. 16, 1940 |
| 2,309,840 | Garvert et al. | Feb. 2, 1943 |
| 2,339,904 | Almquist | Jan. 25, 1944 |
| 2,419,950 | Johnson | May 6, 1947 |
| 2,506,181 | Thibault | May 2, 1950 |